(12) United States Patent
Maheshwari et al.

(10) Patent No.: US 10,997,171 B2
(45) Date of Patent: May 4, 2021

(54) DATABASE PERFORMANCE ANALYSIS BASED ON A RANDOM ARCHIVE

(71) Applicant: Oracle International Corporation, Redwood Shores, CA (US)

(72) Inventors: Arvind Kumar Maheshwari, Pleasanton, CA (US); Uri Shaft, Fremont, CA (US); Karl Dias, Foster City, CA (US); Vishwanath Karra, Los Altos, CA (US); Stephen Wexler, San Carlos, CA (US); Anil Kumar Kothuri, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 262 days.

(21) Appl. No.: 16/024,868

(22) Filed: Jul. 1, 2018

(65) Prior Publication Data
US 2020/0004860 A1 Jan. 2, 2020

(51) Int. Cl.
*G06F 16/2453* (2019.01)
(52) U.S. Cl.
CPC .............................. *G06F 16/24542* (2019.01)
(58) Field of Classification Search
None
See application file for complete search history.

(56) References Cited

U.S. PATENT DOCUMENTS

| 2005/0055383 | A1 | 3/2005 | Dias et al. |
| 2017/0132276 | A1* | 5/2017 | Saurabh ............ G06F 16/24534 |
| 2020/0142894 | A1* | 5/2020 | Papaemmanouil ... G06F 16/217 |

\* cited by examiner

*Primary Examiner* — Giuseppi Giuliani
(74) *Attorney, Agent, or Firm* — Invoke

(57) ABSTRACT

Techniques for analyzing an execution of a query statement based on a random archive are disclosed. A plurality of query statements that are executed during a particular time period are identified. A random sampling function is executed to randomly select a set of query statements from the plurality of query statements. Execution plans and/or performance metrics associated with each execution of the randomly-selected query statements are stored into a random archive. Responsive to determining that a performance metric for a current execution of a particular query statement does not satisfy a performance criteria, information associated with the particular query statement from the random archive is analyzed. A model plan characteristic associated with an execution of the particular query statement stored in the random archive is determined. An execution plan associated with the model plan characteristic is determined for another execution of the particular query statement.

25 Claims, 5 Drawing Sheets

DATABASE PERFORMANCE ANALYSIS BASED ON A RANDOM ARCHIVE

TECHNICAL FIELD

The present disclosure relates to database performance analysis. In particular, the present disclosure relates to database performance analysis based on a random archive.

BACKGROUND

Databases are widely used for storing information of businesses, organizations and/or individuals. Query statements are code used for storing, manipulating, searching, and/or retrieving data in databases. Query statements may be written in various languages, such as Structured Query Language (SQL), Cypher, SPARQL, SchemeQL, and XQuery. An execution of a query statement on a database may also be referred to herein as a "query execution."

A large number of query statements may be executed on a databases. Efficient query execution is critical to the needs of many entities. Performance metrics of a query execution include, for example, time spent by a central processing unit (CPU) to process the query statement (also referred to as "CPU time"), time spent on input and/or output (I/O) operations to process the query statement (also referred to as "I/O time"), and total time spent processing the query statement (also referred to as "total execution time"). The performance of a particular execution of a query statement may depend on various factors, including what execution plan is used to execute the query statement, the volume of data relevant to the query statement, and/or whether there are any indexes relevant to the query statement. Hence, different executions of the same query statement may be associated with different performance metrics.

As an example, the performance associated with a particular query statement may degrade over time. The degradation in performance may be due to an increasing volume of data that is relevant to the query statement.

As another example, the performance associated with a particular query statement may abruptly change from good to bad. The performance may satisfy a performance criteria for several months. But the performance may suddenly degrade on a particular day. The change in performance may be due to a change in the execution plan used to execute the particular query statement.

Analyzing query executions over time helps an entity identify query statements that are associated with changing performance metrics. The entity may analyze the query statements at issue to understand causes of the performance change.

However, it is difficult to conduct performance analysis of query executions over time. An entity might not know in advance which query statements need to be analyzed. Any query statement has the possibility of being associated with performance degradation and/or other performance changes. However, due to the large volume of query statements being executed on a database, it may be difficult to store and/or archive performance metrics of all executions of all query statements on the database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
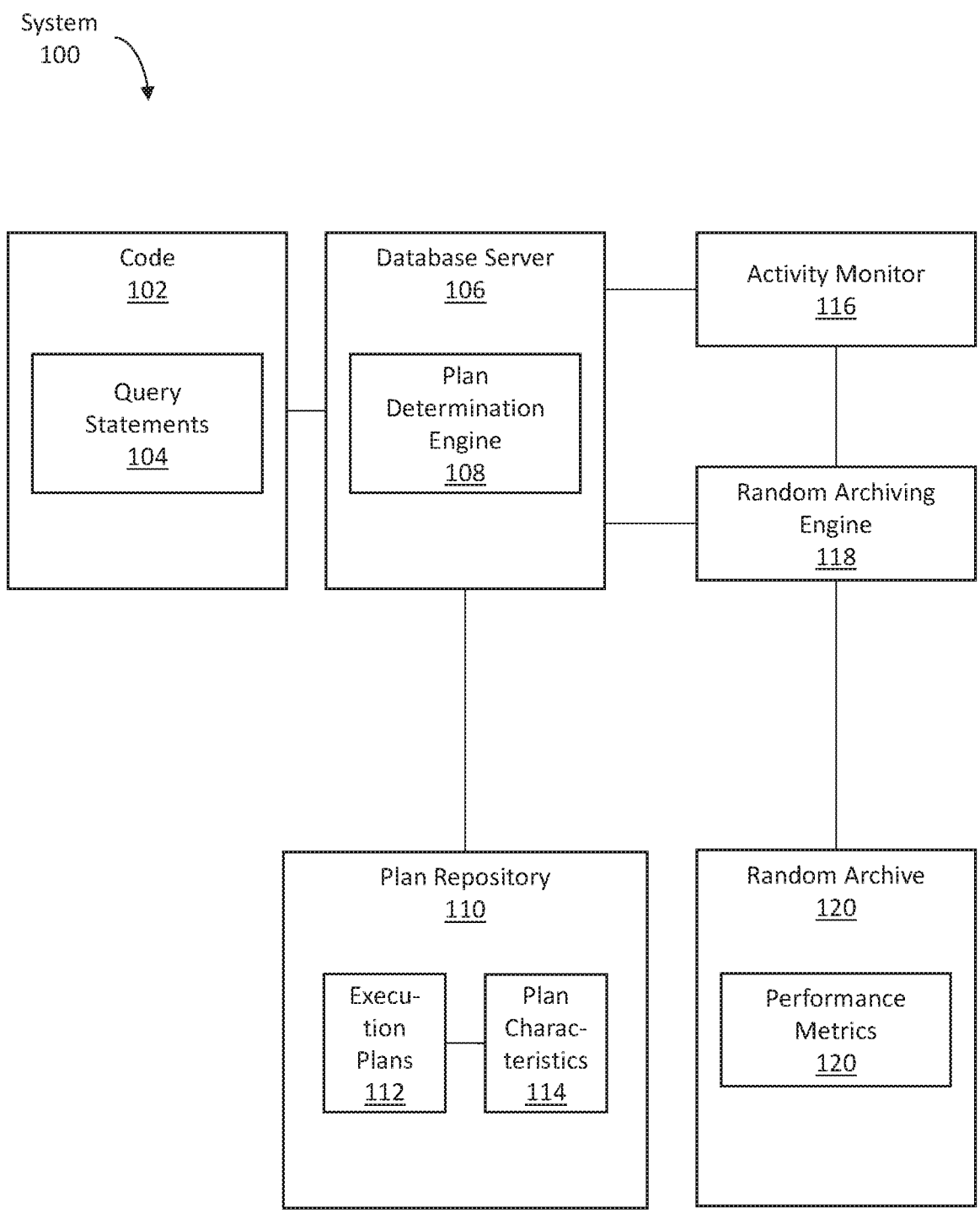
FIG. 1 illustrates a random archiving system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RANDOM ARCHIVING SYSTEM ARCHITECTURE
3. DATABASE PERFORMANCE ANALYSIS BASED ON A RANDOM ARCHIVE
4. EXAMPLE EMBODIMENTS
5. HARDWARE OVERVIEW
6. MISCELLANEOUS; EXTENSIONS

1. General Overview

One or more embodiments include randomly selecting a subset of query statements, which are executed during a particular time period, for archiving. A plurality of query statements that are executed during a particular time period are identified. A random sampling function is executed to randomly select a set of query statements from the plurality of query statements. Execution plans used for each execution of the randomly-selected query statements are identified. Plan characteristics associated with each execution plan may also be identified. Additionally or alternatively, performance metrics associated with each execution of the randomly-selected query statements are identified. The randomly-selected query statements are stored and/or archived with the corresponding execution plans, plan characteristics, and/or performance metrics. The storage of the randomly-selected query statements and corresponding data may be referred to herein as a "random archive."

Only a subset of query statements that are executed during a particular time period are archived into the random archive. Hence, compute and/or storage resources are not overused for maintaining the random archive. Meanwhile, random samples are taken for successive time periods. As data is accumulated in the random archive over time, it is likely that at least one execution of most (if not all) query statements will be included in the random archive. Even though not every query execution is stored, the random archive provides sufficient information for performing database performance analysis.

One or more embodiments include analyzing an execution of a query statement based on a random archive. A current performance metric associated with an execution of a particular query statement is determined. The current performance metric is compared against a performance criteria. The performance criteria may be determined based on historic performance metrics, stored in a random archive, associated with historic executions of the particular query statement. If the current performance metric does not meet the performance criteria, then a corrective action may be needed. An example corrective action may be to modify the way that execution plans are determined for executions of the particular query statement. In particular, a plan characteristic associated with one or more execution plans used for historic executions of the particular query statement is determined from the random archive. An execution plan that is associated with the same plan characteristic is determined for another execution of the particular query statement.

The random archive enables the comparison of current performance metrics associated with a current execution of a particular query statement against historic performance metrics associated with historic executions of the particular query statement. Even though the random archive does not include information on every execution of the particular query statement, the random archive includes sufficient information for analyzing the performance metrics associated with the particular query statement over time.

Further, based on changes in the performance metrics associated with a particular query statement over time, corrective actions may be determined and executed. Characteristics associated with previously well-performing executions of a particular query statement may be identified and hence applied to future executions of the particular query statement.

One or more embodiments described in this Specification and/or recited in the claims may not be included in this General Overview section.

2. Random Archiving System Architecture

FIG. 1 illustrates a random archiving system, in accordance with one or more embodiments. As illustrated in FIG. 1, a system 100 includes a set of code 102, a database server 106, a plan repository 110, an activity monitor 116, a random archiving engine 118, and a random archive 120. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be executed by another component.

In one or more embodiments, a set of code 102 includes instructions for interacting with a database maintained by a database server 106. The code 102 may be written in any of a variety of programming languages, such as SQL, Cypher, SPARQL, SchemeQL, XQuery, or any other data query languages. The code 102 may be written in a declarative programming language or an imperative programming language. Declarative programming languages express the logic of a computation without describing its control flow.

In an embodiment, a set of code 102 includes one or more query statements 104. A query statement 104 is a command that returns a set of data from a database maintained by a database server 106. In SQL, for example, a SELECT statement is an example of a query statement. A query statement 104 may specify a result set without specifying how to search and/or identify the result set. As further described below, a database server 106 may translate and/or convert a query statement 104 into an execution plan 112, which includes an ordered sequence of steps to search and/or identify the result set.

In one or more embodiments, a database server 106 refers to hardware and/or software configured to maintain a database. A database server 106 performs various operations on a database based on a set of code 102 and query statements 104 therein. A database server 106 may be implemented using a single digital device or multiple digital devices. A database server 106 may be implemented in a cloud environment (such as a private cloud, a public cloud, and/or a hybrid cloud). A database is a collection of information that is organized for efficient access. Different types of databases include relational databases, flat-file databases, key-value stores, document-oriented databases, column data stores, and object databases.

In an embodiment, a database server 106 includes a plan determination engine 108. A plan determination engine 108 translates and/or converts a query statement 104 into an execution plan 112. As described above, a query statement 104 may specify a result set without specifying how to search and/or identify the result set. There may be multiple ways for searching and/or identifying the requested data, through different steps, different sequences of steps, and/or different data structures and/or indexes. A particular way for searching and/or identifying the requested data may be specified in an execution plan 112, as further described below. Different execution plans 112 require different processing times and/or resources. A plan determination engine 108 may attempt to determine the most optimal execution plan 112 for executing a query statement 104 under a given circumstance. Different circumstances may result in determining different execution plans 112 for the same query statement 104. A plan determination engine 108 may also be referred to as a "query optimizer."

In an embodiment, a plan determination engine 108 analyzes an execution of a query statement 104 based on a random archive 120. In particular, a plan determination engine 108 determines an execution plan 112 for a query statement 104 based on information stored in a random archive 120. Examples of operations for analyzing an execution of a query statement based on a random archive are described below with reference to FIGS. 2A-B.

In one or more embodiments, a plan repository 110 is a data repository for storing execution plans 112 and associated data. The term "data repository" generally refers to any type of storage unit and/or device (e.g., a file system, database, collection of tables, or any other storage mechanism) for storing data. A data repository may include multiple different storage units and/or devices. The multiple different storage units and/or devices may or may not be of the same type or located at the same physical site.

In an embodiment, a plan repository 110 may be implemented or may execute on the same computing system as a database server 106. Alternatively or additionally, a plan repository 110 may be implemented or executed on a computing system separate from a database server 106. The plan repository 110 may be communicatively coupled to the database server 106 via a direct connection or via a network.

In an embodiment, a plan repository 110 may be implement as a cache (also referred to as a "plan cache"). Execution plans 112 that have been recently used are stored in the plan repository 110. Execution plans 112 that have not been recently used are removed from the plan repository 110.

In an embodiment, a plan repository 110 stores a particular execution plan 112 along with associated data, such as a query statement 104 that was executed using the particular execution plan 112, identifiers of one or more executions of a query statement 104 that used the particular execution plan 112, and/or one or more timestamps at which the particular execution plan 112 was used.

In an embodiment, an execution plan 112 is an ordered sequence of steps for searching and/or identifying a set of data requested by a query statement 104. An execution plan 112 is associated with one or more plan characteristics 114. Plan characteristics 114 of a particular execution plan 112 may be stored in the plan repository 110. Additionally or alternatively, plan characteristics 114 of a particular execution plan 112 may be determined by analyzing the particular execution plan 112 at the time that information about the plan characteristics 114 is needed.

A plan characteristic 114 may describe a particular aspect of an execution plan 112. A plan characteristic 114 may describe the following example aspects:
 (a) whether an index is used;
 (b) a type of an index that is used;
 (c) an identity of a table that is used;
 (d) a type of operation that is executed;
 (e) a sequence of steps that are executed;
 (f) a field that is used to access an entry in a table; and/or
 (g) a complete set of steps that are included in the first execution plan.

Examples of types of indexes that may be used include clustered, non-clustered, unique, and filtered. For example, a clustered index sorts and stores the data rows of the table or view in order based on the clustered index key. The clustered index may be implemented as a b-tree index structure. A non-clustered index can be defined on a table or view with a clustered index or on a heap. Each index row in the non-clustered index contains the non-clustered key value and a row locator. This locator points to the data row in the clustered index or heap having the key value. The rows in the index are stored in the order of the index key values, but the data rows are not guaranteed to be in any particular order unless a clustered index is created on the table. A unique index ensures that the index key contains no duplicate values and therefore every row in the table or view is in some way unique. Uniqueness can be a property of both clustered and non-clustered indexes. A filtered index is an optimized non-clustered index. The filtered index uses a filter predicate to index a portion of rows in the table.

Examples of types of operations include "table scan," "index scan," "index seek," "unique scan," "range scan," "nested loop join," "merge join," "hash join," and "sort." For example, an index scan is where an entire index is read looking for matches. The time required for the operation is proportional to the size of the index. An index seek is where a b-tree structure (and/or other structure) of an index is used to directly seek matching records. The time required for the operation is proportional to the number of matching records.

Examples of sequences of steps include: (a) performing a single scan or seek on an index for data satisfying multiple criteria, and (b) performing a scan or seek for each criteria, and performing a join to identify data included in each scan or seek result.

As an example, a query statement may seek all data associated with persons who are less than 25 years old and greater than 6 feet in height. The query statement may be written as: SELECT*FROM persons WHERE age>25 and height>6.

One execution plan for the query statement may include scanning each row in the persons table to find rows that satisfy both conditions: age>25 and height>6. The plan characteristics of the execution plan include: not using any index; using the persons table; using a "table scan" operation; and a sequence of operations including performing a single scan for data satisfying multiple criteria.

Another execution plan for the query statement may include performing an "index seek" operation on an index for the age column to identify rows satisfying age>25. The execution plan may further include performing an "index seek" operation on an index for the height column to identify rows satisfying height>6. The execution plan may further include identifying rows that are identified in both "index seek" operations. The plan characteristics of the execution plan include: using an index; using the persons table; using an "index seek" operation; and a sequence of operations including performing a scan or seek for each criteria, and performing a join to identify data included in each scan or seek result.

In one or more embodiments, an activity monitor 116 refers to hardware and/or software configured to monitor activity of a database server 106. An activity monitor 106 may monitor activity of a database server 106 in real-time and/or in streaming fashion. As activity occurs on the database server 106, the activity monitor 106 may record or store the activity data. Additionally or alternatively, an activity monitor 106 may take snapshots (also referred to herein as "activity snapshots") of activity occurring on a database server 106. The activity monitor 106 may take activity snapshots at regular time intervals and/or in response to an event trigger.

In one or more embodiments, a random archiving engine 118 refers to hardware and/or software configured to perform operations described herein for randomly selecting a subset of query statements, which are executed during a particular time period, for archiving. A random archiving engine 118 may randomly selecting a subset of query statements by applying a random sampling function. A random sampling function may use a variety of factors to obtain randomness. As an example, a random sampling function may include applying a hash function to a value determined based on a current time of a database server. Specifically, the random sampling function may include performing concatenating (a) an identifier of a query statement and (b) a current time of a database server. A hash function is applied to the concatenated result. A result of the hash function is compared with a threshold value. If the result of the hash function is less than or equal to the threshold value, then the query statement is selected. If the result of the hash function is greater than the threshold value, then the query statement is not selected. As another example, a random sampling function may use a random number generator. Examples of operations for randomly selecting a subset of query statements, which are executed during a particular time period, for archiving are described below with reference to FIGS. 2A-B.

In one or more embodiments, each of a database server 106, an activity monitor 116, and/or a random archiving engine 118 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, and/or a personal digital assistant (PDA). In one or more embodiments, a database server 106, an activity monitor 116, and/or a random archiving engine 118 may be implemented as a single component or as multiple components within the system 100.

In one or more embodiments, a random archive 120 is a data repository for storing performance metrics 120 and associated data. In particular, a random archive 120 stores performance metrics 120 for executions, on a database server 106, of query statements 104 that were randomly selected by a random archiving engine 118. A random archive 120 may be implemented or may execute on the same computing system as a random archiving engine 118. Alternatively or additionally, a random archive 120 may be implemented or executed on a computing system separate from a random archiving engine 118. The random archive 120 may be communicatively coupled to the random archiving engine 118 via a direct connection or via a network.

In an embodiment, a random archive 120 stores a particular set of performance metrics 120 along with associated data, such as an identifier of a query execution associated with the particular set of performance metrics 120, a timestamp of a query execution associated with the particular set of performance metrics 120, a query statement 104 that was executed with the particular set of performance metrics 120, an execution plan 112 that was used in a query execution associated with the particular set of performance metrics 120, and/or plan characteristics 114 of an execution plan 112 that was used in a query execution associated with the particular set of metrics 120.

In an embodiment, a performance metric 120 is a measure of query performance. A performance metric 120 may correspond to an amount of time to complete the execution of a query. A performance metric 120 may correspond to a number of resources utilized to perform the query. Examples of performance metrics 120 include, for example, a CPU time, an I/O time, and a total execution time. A CPU time is a duration of time spent by a CPU to process a query statement 104. An I/O time is a duration of time spent on I/O operations to process a query statement 104. In a particular example, an I/O time is a duration of time in which a CPU is idle (that is, not executing any tasks) while there is at least one outstanding I/O operation requested by a task scheduled on the CPU. Examples of I/O operations include write operations to write onto a disk, read operations to read from a disk, and/or receiving user input via a user interface. A total execution time is a total duration of time spent processing a query statement 104. The total execution time includes CPU time, I/O time, as well as any other idle time that may have occurred during the processing of the query statement 104. Other idle time may include, for example, time waiting for a release on a lock of a certain row in a database maintained by a database server 106.

In an embodiment, a performance metric 120 may be determined by an activity monitor 116 and/or a random archiving engine 118. As an example, an activity monitor may monitor activity of a database server. The activity monitor may determine a start time of a particular query execution, and an end time of the particular query execution. The activity monitor may determine CPU time, I/O time, and total execution time of the particular query execution. As another example, an activity monitor may take activity snapshots of a database server. The activity monitor may take activity snapshots at regular intervals, for example, once every second. A random archiving engine may aggregate the activity snapshots from the activity monitor to determine performance metrics. The random archiving engine may determine that three activity snapshots show that a CPU is processing operations for a particular query execution. Since activity snapshots are taken every second, the random archiving engine may approximate the CPU time for the particular query execution as 3 seconds.

In an embodiment, information associated with performance metrics 120 may be stored with respect to metric buckets. A metric bucket corresponds to a particular range of a performance metric. A query execution is categorized into a particular metric bucket if the performance metric for the query execution falls within the range of the particular metric bucket.

The following are examples of metric buckets:
a metric bucket for the range 0-3 seconds of CPU time;
a metric bucket for the range 4-10 seconds of CPU time;
a metric bucket for the range 11 seconds and above of CPU time;
a metric bucket for the range 0-3 seconds of I/O time;
a metric bucket for the range 4-10 seconds of I/O time;
a metric bucket for the range 11 seconds and above of I/O time;
a metric bucket for the range 0-3 seconds of total execution time;
a metric bucket for the range 4-10 seconds of total execution time; and
a metric bucket for the range 11 seconds and above of total execution time.

As an example, a particular query execution may be associated with the following performance metrics: 1.1 seconds of CPU time; 2.4 seconds of I/O time; and 4.9 seconds of total execution time. Based on the example metric buckets above, the particular query execution corresponds to: (a) the metric bucket for the range 0-3 seconds of CPU time; (b) the metric bucket for the range 0-3 seconds of I/O time; and (c) the metric bucket for the range 4-10 seconds of total execution time.

In an embodiment, information associated with performance metrics 120 may be presented to a user at a user interface. Examples of user interfaces include a graphical user interface (GUI), a command line interface (CLI), a haptic interface, and a voice command interface. Additionally or alternatively, information associated with performance metrics 120 may be transmitted to an application via an application programming interface (API). Additionally or alternatively, information associated with performance metrics 120 may be transmitted to a database server 106 and/or a plan determination engine 108 for performing database performance analysis.

In one or more embodiments, multiple database servers 106 may be included in the system 100. A set of code 102 is executed on multiple database servers 106. Each database server 106 may be associated with a plan repository 110, or multiple database servers 106 may share a common plan repository 110. An activity monitor 116 is configured to monitor activity of the database servers 106. A random archiving engine 118 is configured to perform operations described herein for randomly selecting a subset of query statements, which are executed on the database servers 106, for archiving. Hence, query executions across multiple databases may be analyzed together and/or compared against each other.

3. Database Performance Analysis Based on a Random Archive

Figure 2A:
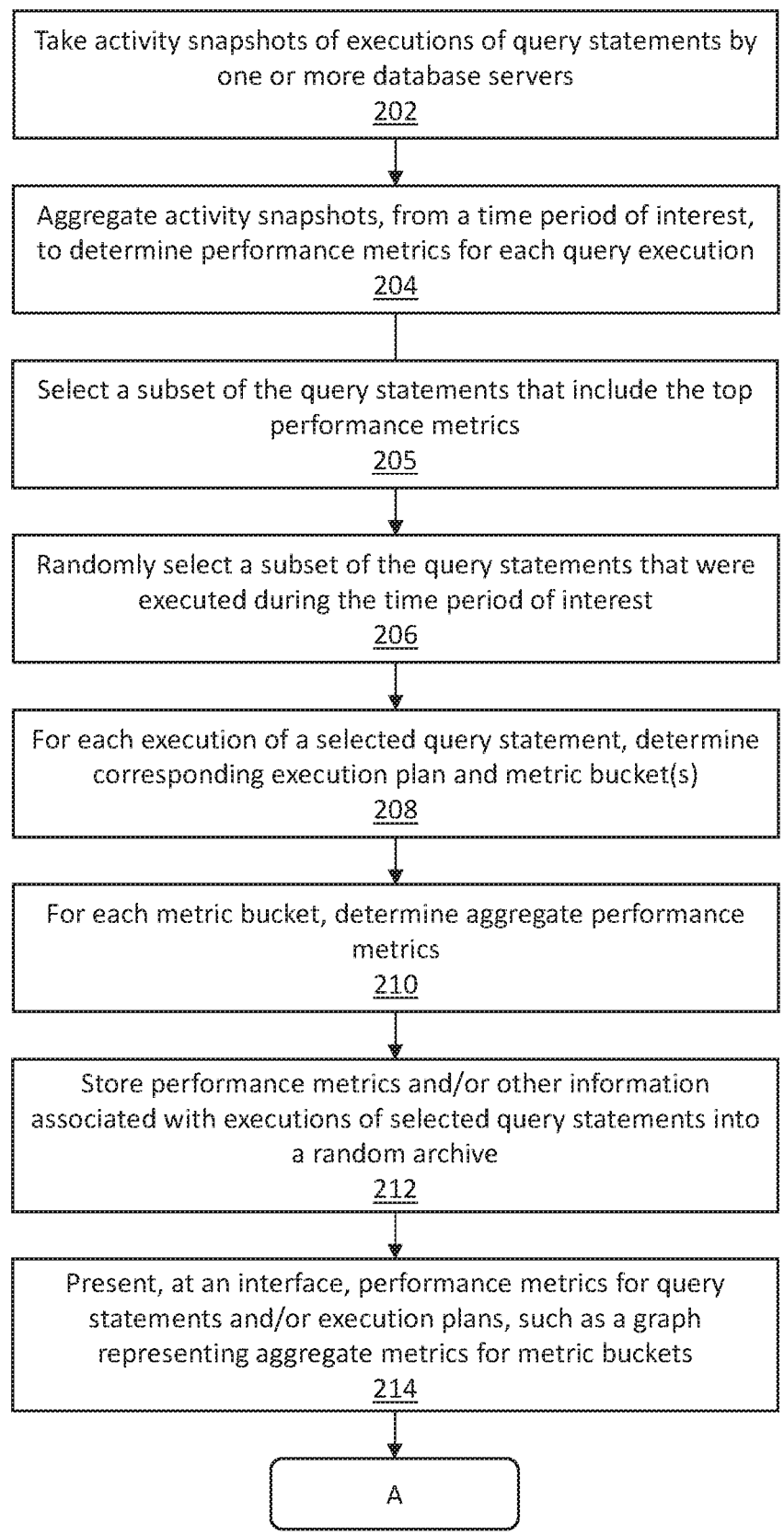
FIGS. 2A-B illustrates an example set of operations for conducting database performance analysis based on a random archive, in accordance with one or more embodiments.
Figure 2B:
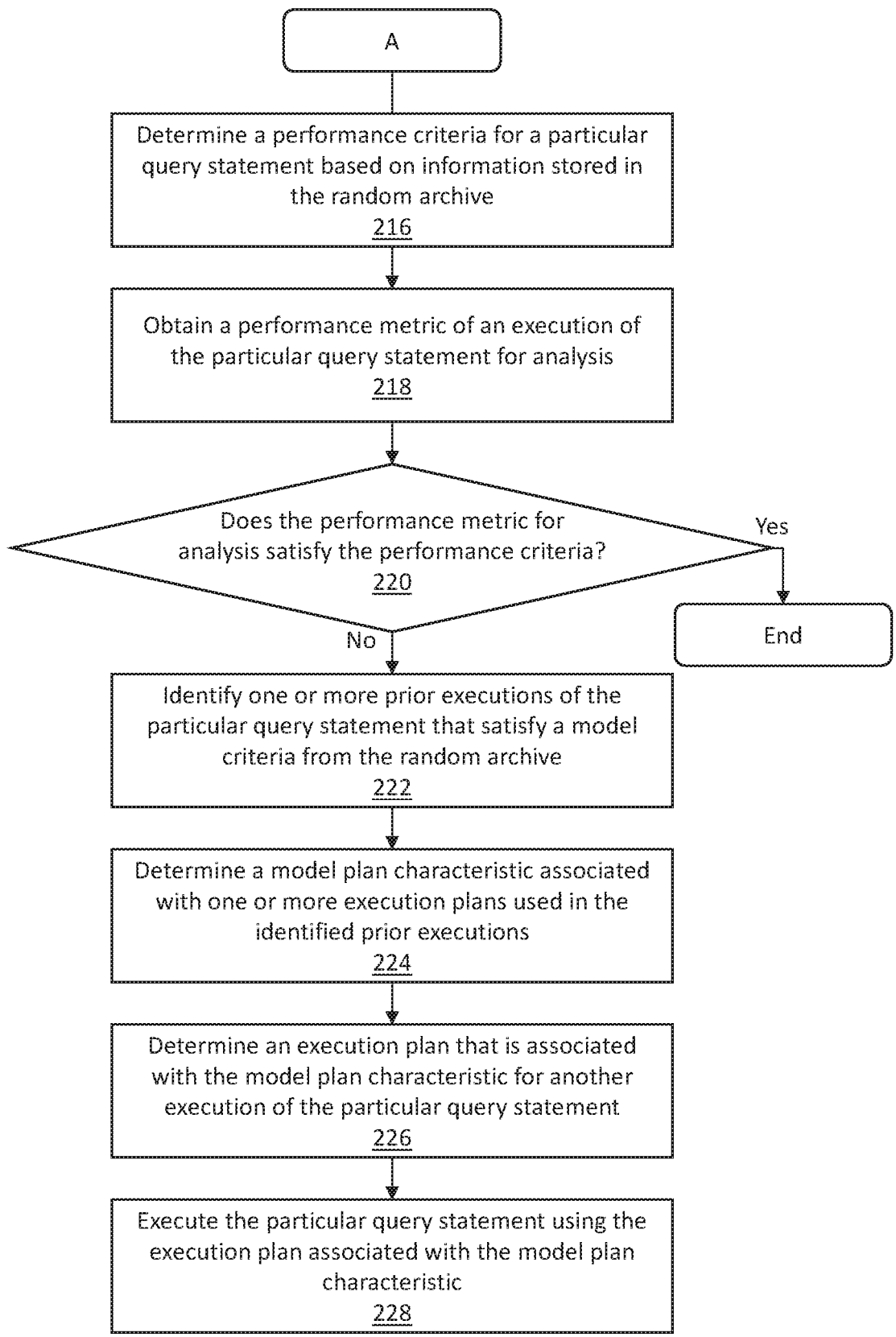

FIGS. 2A-B illustrates an example set of operations for conducting database performance analysis based on a random archive, in accordance with one or more embodiments. One or more operations illustrated in FIGS. 2A-B may be modified, rearranged, or omitted all together. Accordingly, the particular sequence of operations illustrated in FIGS. 2A-B should not be construed as limiting the scope of one or more embodiments.

One or more embodiments include taking activity snapshots of executions of query statements by one or more database servers (Operation 202). Activity snapshots of query executions on each database server are captured at regular time intervals. Additionally or alternatively, activity snapshots of query executions are captured in response to event triggers. An event trigger may be, for example, a load on the database server exceeding a threshold value, a response time for a particular query statement exceeding a threshold value, and/or a memory space associated with the database server falling below a threshold value.

Capturing an activity snapshot includes identifying each execution of a query statement that is taking place on the database server. Each query execution is associated with an identifier (also referred to herein as an "execution identifier" or "execution ID"). Additional information that is captured include the query statement being executed (also referred to herein as a "Statement ID"), the execution plan used to execute the query statement (also referred to herein as a "Plan ID"), the start time for the query execution, and/or the status of the query execution. Examples of statuses that may be assumed by a query execution include "On CPU," "Waiting for User I/O," "Waiting for System I/O," and "Idle." "On CPU" indicates that the CPU is performing operations. "Waiting for User I/O" and "Waiting for System I/O" indicate that the CPU is idle and waiting for user and/or system I/O operations to be completed. "Idle" indicates that the CPU is idle but not necessarily waiting for user and/or system I/O operations.

One or more embodiments include aggregating activity snapshots, from a time period of interest, to determine performance metrics for each query execution (Operation 204). A start time and end time of the time period of interest are determined. Activity snapshots with a timestamp between the start time and end time are selected. A respective subset of activity snapshots that include each execution identifier is determined. Various performance metrics may be aggregated, as further described below.

As described above, a subset of activity snapshots that include a particular execution identifier is determined. From the subset, activity snapshots indicating that the particular execution identifier is associated with an "On CPU" status are determined. The duration of time corresponding to the identified activity snapshots is determined. The duration of time is approximated as the "CPU time" for the query execution corresponding to the particular execution identifier.

As described above, a subset of activity snapshots that include a particular execution identifier is determined. From the subset, activity snapshots indicating that the particular execution identifier is associated with a "Waiting for User I/O" status and/or a "Waiting for System I/O" status are determined. The duration of time corresponding to the identified activity snapshots are determined. The duration of time is approximated as the "I/O time" for the query execution corresponding to the particular execution identifier.

As described above, a subset of activity snapshots that include a particular execution identifier is determined. From the subset, activity snapshots indicating that a particular execution identifier is associated with any status other than "Completed" are determined. The duration of time corresponding to the identified activity snapshots are determined. The duration of time is approximated as the "total execution time" for the query execution corresponding to the particular execution identifier.

The duration of time corresponding to a set of activity snapshots may be determined in various ways. Examples for determining the duration of time corresponding to a set of activity snapshots are described below.

As an example, activity snapshots may be captured every second. Three activity snapshots may indicate that Execution ID 123 is associated with an "On CPU" status. Since each activity snapshot corresponds to 1 second, the query execution corresponding to Execution ID 123 may be determined to have a CPU time of 3 seconds.

As another example, activity snapshots may be captured in response to event triggers. The first activity snapshot may be captured at 9:00:01. The second activity snapshot may be captured at 9:00:05. The third activity snapshot may be captured at 9:00:14. The second and third activity snapshots may indicate that Execution ID 123 is associated with an "On CPU" status. The second activity snapshot corresponds to a four-second interval. The third activity snapshot corresponds to a nine-second interval. Adding the time intervals corresponding to the relevant activity snapshots, the query execution corresponding to Execution ID 123 may be determined to have a CPU time of 4+9=13 seconds.

As another example, activity snapshots may be captured in response to event triggers. The first activity snapshot may be captured at 9:00:01. The second activity snapshot may be captured at 9:00:05. The third activity snapshot may be captured at 9:00:14. The first, second, and third activity snapshots may indicate that a query execution corresponding to Execution ID 123 is being processed. Specifically, Execution ID 123 may be associated with any status other than "Completed."

Continuing the example, a timestamp of the first activity snapshot indicating that the query execution corresponding to Execution ID 123 is being processed may be identified. The timestamp of the first activity snapshot may be 9:00:01. A timestamp of the last activity snapshot indicating that the query execution corresponding to Execution ID 123 is being processed may be identified. The timestamp of the last activity snapshot may be 9:00:14. A duration of time between the first activity snapshot and the last activity snapshot may be determined as 13 seconds. Hence, the query execution corresponding to Execution ID 123 may be determined to have a total execution time of 13 seconds.

In one or more embodiments, additional and/or alternative operations may be executed to determine performance metrics associated with query executions. In an embodiment, performance metrics may be determined and stored as query statements are being executed. Performance metrics may be determined and stored in relation to the different executions of a same query statement. As a query execution begins, the start time is identified. When the query execution ends, the end time is identified. The difference between the start time and the end time may be determined as the total execution time for the query execution. Additionally or alternatively, as a query execution begins to enter "On CPU" status, the start time is identified. When the query execution exits "On CPU" status, the end time is identified. The difference between the start time and the end time may be determined as the CPU time for the query execution.

One or more embodiments include selecting a subset of the query statements that include the top performance metrics (Operation 205). The performance metrics for each query execution are compared against each other. A number of top performance metrics are identified. The query statements corresponding to the top performance metrics are selected.

As an example, a set of query executions and associated CPU times may be as follows:
Execution of Statement ID 123—12 seconds;
Execution of Statement ID 123—9 seconds;
Execution of Statement ID 456—5 seconds;
Execution of Statement ID 456—10 seconds;
Execution of Statement ID 758—11 seconds;
Execution of Statement ID 888—5 seconds.

The top three CPU times may be identified as 12 seconds, 11 seconds, and 10 seconds. The query executions associated with the top three CPU times correspond to Statement ID 123, Statement ID 758, and Statement ID 456. Hence, Statement ID 123, Statement ID 758, and Statement ID 456 are selected. Statement ID 888 is not selected.

As another example, a set of query executions and associated CPU times may be as follows:
Execution of Statement ID 123—12 seconds;
Execution of Statement ID 123—10 seconds;
Execution of Statement ID 758—8 seconds.

The top two CPU times may be identified as 12 seconds and 10 seconds. The query executions associated with the top two CPU times correspond to Statement ID 123. Hence, Statement ID 123 is selected. Statement ID 758 is not selected.

One or more embodiments include randomly selecting a subset of the query statements that were executed during the time period of interest (Operation 206). A random sampling function is applied to the query statements that are executed during the time period of interest. A subset of the query statements are randomly selected; the remaining subset of query statements are not selected. Various ways of random sampling may be used, as further described below.

In an embodiment, an identifier of the query statement of each query execution, within the time period of interest, is determined. Each Statement ID and the current time of the database server are concatenated. The current time of the database server introduces a first level of randomness. A hash function is applied to the concatenated result. The hash function introduces a second level of randomness. If the result of the hash is less than or equal to a threshold value, then the query statement is selected. Information associated with each execution of a selected query statement, within the time period of interest, is selected for storage into a random archive. The information stored may include performance metrics for each execution of the selected query statement. If the result of the hash is greater than the threshold value, then the query statement is not selected. Information associated with the non-selected query statements are not stored into the random archive.

In an embodiment, identifiers of query statements that were executed at least once within the time period of interest are determined. The query statement identifiers may be arranged into a list. A random number generator may be applied to randomly select query statement identifiers from the list. Information associated with each execution of a selected query statement, within the time period of interest, is selected for storage into a random archive. The information stored may include performance metrics for each execution of the selected query statement. Information associated with the non-selected query statements are not stored into the random archive.

In an embodiment, query statements may be randomly selected as query executions are occurring. Query executions on the database server may be monitored. As a query statement is executed, a random sampling function may be applied to determine whether to select the query statement.

In an embodiment, a number of query statements that are randomly selected for a particular time period of interest is fixed. The number of query statements that are randomly selected may be fixed by, for example, a configuration and/or user input. Alternatively, a number of query statements that are randomly selected for a particular time period of interest is modified based on various factors. As an example, a number of query statements that are randomly selected for a particular time period of interest may depend on the total number of query statements that are executed during the particular time period of interest. The number of query statements that are randomly selected may be directly proportional to the total number of query statements that are executed. As another example, a number of query statements that are randomly selected for a particular time period of interest may depend on the type of query statements that are executed during the particular time period of interest, the load of the database server during the particular period of interest, the time of day, the day of week, and/or other factors.

One or more embodiments include determining a corresponding execution plan and one or more corresponding metric buckets for each execution of a selected query statement (Operation 208).

An execution plan corresponding to a particular query execution is specified in the activity snapshots captured at Operation 202, or is otherwise determined based on monitoring the activity of the database server. Execution plans of selected query statements are determined. Optionally, the execution plans of selected query statements are analyzed to determine corresponding plan characteristics.

A metric bucket corresponding to a particular query execution is determined based on the performance metrics determined at Operation 204. If a performance metric of a particular query execution falls within the range corresponding to a particular metric bucket, then the particular query execution is categorized into the particular metric bucket.

As an example, performance metrics for a particular query execution include a CPU time of 2.3 seconds, an I/O time of 4.0 seconds, and a total execution time of 12.4 seconds. The particular query execution may be determined as being associated with each of (a) a metric bucket for the range 0-3 seconds of CPU time, (b) a metric bucket for the range 4-10 seconds of I/O time, and (c) a metric bucket for the range 11 seconds and above of total execution time.

One or more embodiments include determining aggregate performance metrics for each metric bucket (Operation 210). Aggregate performance metrics may be determined for each metric bucket associated with a particular query statement. Additionally or alternatively, aggregate performance metrics may be determined for each metric bucket associated with a particular execution plan. Aggregate performance metrics may include, for example, an average of performance metrics of query executions in the bucket, a total of performance metrics of query executions in the bucket, and/or a count of query executions in the bucket.

As an example, the following query executions may be selected for storage into a random archive:
Execution ID 123, Statement ID 456, Plan ID 789, CPU time 2.0 seconds, CPU time bucket 0-3 seconds;
Execution ID 124, Statement ID 456, Plan ID 789, CPU time 2.1 seconds, CPU time bucket 0-3 seconds;
Execution ID 125, Statement ID 456, Plan ID 790, CPU time 2.2 seconds, CPU time bucket 0-3 seconds;
Execution ID 126, Statement ID 456, Plan ID 790, CPU time 5.3 seconds, CPU time bucket 4-10 seconds.

Aggregate performance metrics may be determined for each metric bucket associated with a particular query statement. Execution IDs 123, 124, 125 are each associated with the same metric bucket (CPU time bucket 0-3 seconds) and the same query statement (Statement ID 456). However, Execution ID 126 is not associated with the same metric bucket. Hence, the performance metrics of Execution IDs 123, 124, 125 are aggregated. The performance metrics of Execution ID 126 are not aggregated with the performance metrics of Execution IDs 123, 124, 125. An average CPU time for Execution IDs 123, 124, 125 may be computed as $(2.0+2.1+2.2)/3=2.1$ seconds. A total CPU time for Execution IDs 123, 124, 125 may be computed as $2.0+2.1+2.2=6.3$ seconds. A count of query executions may be determined as three. Hence, the metric bucket for the range 0-3 seconds of CPU time, for Statement ID 456, includes: average CPU time 2.1 seconds, total CPU time 6.3 seconds, and count 3.

Aggregate performance metrics may be determined for each metric bucket associated with a particular execution plan. Execution IDs 123 and 124 are each associated with the same metric bucket (CPU time bucket 0-3 seconds) and the same execution plan (Plan ID 789). Hence, the performance metrics of Execution IDs 123 and 124 are aggregated. An average CPU time may be computed as $(2.0+2.1)/2=2.05$ seconds. A total CPU time may be computed as $2.0+2.1=4.1$ seconds. A count of query executions may be determined as two. Hence, the metric bucket for the range 0-3 seconds of CPU time, for Plan ID 789, includes: average CPU time 2.05 seconds, total CPU time 4.1 seconds, and count 2. Meanwhile, Execution IDs 125s and 126 are associated with the same execution plan (Plan ID 790), but different metric buckets. Hence, the performance metrics of Execution IDs 125s and 126 are not aggregated with each other.

One or more embodiments include storing performance metrics and/or other information associated with executions of selected query statements into a random archive (Operation 212). As described above at Operation 206, query executions are randomly selected for storage into a random archive. The selected query executions are stored into the random archive along with related information, such as:
  (a) the corresponding performance metrics, which are determined at Operation 204;
  (b) the corresponding execution plans, which are determined at Operation 208;
  (c) plan characteristics of the corresponding execution plans, which are determined at Operation 208; and/or
  (d) the corresponding metric buckets, which are determined at Operation 208.

Additionally, aggregate performance metrics, which are determined at Operation 210, are stored into the random archive.

Based on the random selection of Operation 206, not all query statements that are executed within a time period of interested are selected for storage. However, as described above, all executions of each selected query statement are selected for storage.

In an embodiment, operations 202-212 may be iterated for successive time periods of interest. During each iteration for a different time period of interest, different query statements may be randomly selected for storage. Over time, an increasing number of unique query statements may be selected for storage.

As an example, Statement A, Statement B, and Statement C may be executed on a database server during a first time period. Statement A, Statement B, and Statement C may be executed on the database server during a second time period. Statement A, Statement B, and Statement C may be executed on the database server during a third time period.

Operations 202-212 may be performed with respect to the first time period. Based on random selection of the query statements that were executed during the first time period, Statement A is selected for storage. Information associated with all executions of Statement A during the first time period are stored in a random archive. Statement B and Statement C are not selected for storage.

Operations 202-212 may be performed with respect to the second time period. Based on random selection of the query statements that were executed during the second time period, Statement B is selected for storage. Information associated with all executions of Statement B during the second time period are stored in the random archive. Statement A and Statement C are not selected for storage.

Operations 202-212 may be performed with respect to the third time period. Based on random selection of the query statements that were executed during the third time period, Statement C is selected for storage. Information associated with all executions of Statement C during the third time period are stored in the random archive. Statement A and Statement B are not selected for storage.

Hence, after Operations 202-212 are performed with respect to multiple time periods, information for each of Statement A, Statement B, and Statement C are included in the random archive. Over time, an increasing number of unique query statements are included in the random archive.

One or more embodiments include presenting, at an interface, aggregate performance metrics for query statements and/or execution plans, such as a graph representing aggregate metrics for metric buckets (Operation 214). Performance metrics for query executions may be aggregated based on query statement and/or execution plan. Aggregate performance metrics associated with query statements and/or execution plans may be presented at a user interface. Additionally or alternatively, aggregate performance metrics associated with query statements and/or execution plans may be transmitted via an application programming interface.

As an example, the following query executions may be selected for storage into a random archive:
Execution ID 123, Statement ID 456, Plan ID 789, CPU time 2.0 seconds, CPU time bucket 0-3 seconds;
Execution ID 124, Statement ID 456, Plan ID 789, CPU time 2.1 seconds, CPU time bucket 0-3 seconds;
Execution ID 125, Statement ID 456, Plan ID 790, CPU time 2.2 seconds, CPU time bucket 0-3 seconds;

Execution ID 126, Statement ID 457, Plan ID 791, CPU time 5.3 seconds, CPU time bucket 4-10 seconds.

Continuing the example, an average CPU time may be determined for all query executions associated with the same query statement. Query executions associated with the same query statement (Statement ID 456) include: Execution IDs 123, 124, and 125. Execution ID 126 is not associated with the same query statement. The average CPU may be (2.0+2.1+2.2)/3=2.1 seconds. The average CPU time of 2.1 seconds for query executions associated with Query Statement 456 may be presented at a user interface.

Continuing the example, an average CPU time may be determined for all query executions associated with the same execution plan. Query executions associated with the same execution plan (Plan ID 789) include: Execution IDs 123 and 124. Even though Execution ID 125 is associated with the same query statement (Statement ID 456) as Execution IDs 123 and 124, Execution ID 125 is associated with a different execution plan (Plan ID 790). Hence, Execution ID 125 is not included when determining the average CPU. The average CPU may be (2.0+2.1)/2=2.05 seconds. The average CPU time of 2.05 seconds for query executions associated with Plan ID 789 may be presented at a user interface.

In an embodiment, performance metrics associated with different database servers may be presented. An interface presents (a) performance metrics associated with executions of a particular query statement, using any execution plan, on a first database server and (b) performance metrics associated with executions of the particular query statement, using any execution plan, on a second database server. Additionally or alternatively, an interface presents (a) performance metrics associated with executions of a particular query statement, using a particular execution plan, on a first database server and (b) performance metrics associated with executions of the particular query statement, using the particular execution plan, on a second database server. Hence, performance metrics associated with executions of the same query statement on different database servers may be compared against each other. Performance metrics associated with executions of a particular query statement on a first database server may be better than performance metrics associated with executions of the particular query statement on a second database server.

One or more embodiments include determining a performance criteria for a particular query statement based on information stored in the random archive (Operation 216).

In an embodiment, a performance criteria is a criteria for determining whether a particular query statement should be further analyzed for possible performance improvement. A performance criteria for a particular query statement is determined based on previously-determined performance metrics for the particular query statement.

In an embodiment, performance metrics of executions of the particular query statement that are stored in the random archive are used for determining the performance criteria. The information stored in the random archive includes only a subset of all executions of the particular query statement on the database server. In particular, Operations 202-212 may be iterated with respect to successive time periods of interest. Different query statements may be randomly selected during each iteration. For a first time period of interest, the iteration of Operations 202-212 may result in selecting the particular query statement for storage. Information associated with all executions of the particular query statement during the first time period of interest are stored. However, for a second time period of interest, iteration of Operations 202-212 may result in not selecting the particular query statement for storage. Information associated with any executions of the particular query statement during the second time period of interest are not stored. Hence, even though the particular query statement is executed during both the first time period and the second time period, only a subset of the executions (the executions within the first time period, but not the executions within the second time period) of the particular query statement is stored.

In an alternative embodiment, performance metrics of executions of the particular query statement are used for determining the performance criteria, regardless of whether the information is stored in the random archive. The performance metrics of all executions, or a subset of executions, of the particular query statement may be used.

Various ways of computing and/or determining a performance criteria may be used, as further described below.

In an embodiment, a performance criteria for a particular query statement may be an average of the performance metrics for the particular query statement. The average may be determined using a mean, median, and/or mode.

In an embodiment, a performance criteria for a particular query statement may be an average of the performance metrics for the particular query statement, plus or minus a particular margin. As an example, an average of the CPU time for a particular query statement may be 4 seconds. A particular margin may be 0.5 seconds. Hence, a performance criteria may be 4+0.5=4.5 seconds. Accordingly, a particular query execution would satisfy the performance criteria if the CPU time for the query execution is below 4.5 seconds. Another query execution would not satisfy the performance criteria if the CPU time for the query execution is above 4.5 seconds.

In an embodiment, a performance criteria for a particular query statement may be based on a performance metric at a particular percentile. As an example, a performance criteria for a particular query statement may be the performance metric for the execution of the particular query statement that is at the 20th percentile. Hence, the performance metric for the execution of the particular query statement that is better than 20% of all executions of the particular query statement is used as the performance criteria.

In an embodiment, a performance criteria for a particular query statement may be determined based on various weights. Weights may be determined based on various factors. As an example, a particular query statement may be executed during working hours and during off hours. Performance metrics for query executions during working hours may be more important for analysis than performance metrics for other time periods. Performance metrics for query executions during working hours may be weighted more heavily than performance metrics for other time periods. Each performance metric for a respective query execution is multiplied by a corresponding weight. A sum of the weighted performance metrics is divided by the number of performance metrics. The result is a weighted-average performance metric, which may be used as a performance criteria for the particular query statement.

In an embodiment, a performance criteria for a particular query statement may be determined based on a normalized performance metric. A performance metric for a query execution may be normalized based on various factors, such as a load of the database server at the time of the query execution, a level of network traffic at the time of the query execution, and a speed of the CPU performing the query execution.

Additional and/or alternative methods for determining a performance criteria for a particular query statement may be used. As an example, a performance criteria may be determined by applying a statistical model to previously-determined performance metrics for the particular query statement. As another example, a performance criteria may be specified via user input. As another example, a performance criteria may be determined based on another application.

One or more embodiments include obtaining a performance metric of an execution of the particular query statement for analysis (Operation 218). A particular query statement is executed on the database server. Information associated with the execution of the particular query statement may but is not necessarily stored in the random archive. Examples of operations for obtaining a performance metric of a query execution are described above with reference to Operations 202-204.

One or more embodiments include determining whether the performance metric for analysis satisfies the performance criteria (Operation 220). The performance metric for analysis, obtained at Operation 218, is compared with the performance criteria for the particular query statement. As an example, a performance criteria for a query statement may be a CPU time less than 3 seconds. A performance metric for an execution of the query statement may be 4 seconds. Hence, the performance metric may be determined as not satisfying the performance criteria.

One or more embodiments include identifying one or more prior executions of the particular query statement that satisfy a model criteria from the random archive (Operation 222).

In an embodiment, a model criteria is a criteria for determining whether characteristics of a prior execution of a particular query statement should be applied to current and/or future executions of the particular query statement. A model criteria for a particular query statement is determined based on previously-determined performance metrics for the particular query statement.

In an embodiment, the model criteria is the same as the performance criteria, as determined above with reference to Operation 216.

In an embodiment, the model criteria is different from the performance criteria. Examples of operations for determining a performance criteria, described above with reference to Operation 216, may be applied to determining a model criteria. According to the above description, a model criteria may be an average of the performance metrics for the particular query statement. Additionally or alternatively, a model criteria may be an average of the performance metrics for the particular query statement, plus or minus a particular margin (for example, subtracting an average CPU time by a particular margin). Additionally or alternatively, a model criteria may be based on a performance metric at a particular percentile (for example, the 80th percentile).

Additional and/or alternative methods for determining a model criteria for a particular query statement may be used. As an example, a model criteria may be determined by applying a statistical model to previously-determined performance metrics for the particular query statement. As another example, a model criteria may be specified via user input. As another example, a model criteria may be determined based on another application.

Performance metrics for one or more prior executions of the particular query statement are retrieved from the random archive. Performance metrics for each prior execution is compared with the model criteria. If the performance metrics for a particular prior execution satisfies the model criteria, then the particular prior execution is analyzed for characteristics that may be applied to current and/or future executions of the particular query statement. If the performance metrics for a particular prior execution does not satisfy the model criteria, then the particular prior execution is not analyzed for characteristics that may be applied to current and/or future executions of the particular query statement.

In an alternative embodiment, there may be no model criteria. Every prior execution of the particular query statement, that is stored in the random archive, is analyzed for characteristics that may be applied to current and/or future executions of the particular query statement.

One or more embodiments include determining a model plan characteristic associated with one or more executions plans used in the identified prior executions (Operation 224). One or more plan characteristics associated with each prior execution identified at Operation 222 are determined. The plan characteristic may be referred to as a "model plan characteristic," which may be applied to a current and/or future execution of the particular query statement. Various ways for determining a model plan characteristic may be used, as further described below.

In an embodiment, the random archive stores a prior query execution along with the associated plan characteristics. Information identifying the plan characteristics is retrieved from the random archive. As an example, a random archive may store information indicating that a particular execution of a query statement corresponding to Statement ID 456 was performed. The particular execution was performed with a particular execution plan that was associated with a particular characteristic. The particular characteristic may be, for example, using a clustered index. Using a clustered index may be determined as a model plan characteristic for Statement ID 456.

In an embodiment, the random archive stores a prior query execution along with the identifier of an associated execution plan. The execution plan is analyzed to determine the plan characteristics. As an example, a random archive may store information indicating that a particular execution of a query statement corresponding to Statement ID 456 was performed. The particular execution was performed using an execution plan corresponding to Plan ID 790. The execution plan corresponding to Plan ID 790 may be retrieved from a plan repository. The execution plan corresponding to Plan ID 790 may be analyzed to determine associated plan characteristics. A plan characteristic may be, for example, a joinder was performed prior to a scan or seek. The sequence of operations (performing a joinder prior to a scan or seek) may be determined as a model plan characteristic for Statement ID 456.

In an embodiment, the random archive stores various executions of the particular query statement. A first set of executions of the particular query statement, stored in the random archive, are associated with a first plan characteristic, but not a second plan characteristic. A second set of executions of the particular query statement, stored in the random archive, are associated with the second plan characteristic, but not the first plan characteristic. A first performance metric associated with the first set of executions of the particular query statement may be determined. A second performance metric associated with the second set of executions of the particular query statement may be determined. The first performance metric associated with the first set of executions may be better than the second performance metric associated with the second set of executions. Hence, the first plan characteristic associated with the first set of executions is determined as a model plan characteristic for the particular query statement. However, the second plan characteristic is not a model plan characteristic for the particular query statement.

In an embodiment, conditions that are needed for using an execution plan with a particular model plan characteristic are determined. Whether the necessary conditions are present is verified. If the necessary conditions are not present, then corrective actions may be performed to provide the necessary conditions. As an example, a model plan characteristic may be the use of a particular non-clustered index. A necessary condition of using an execution plan with the model plan characteristic is the existence of the particular non-clustered index. A search may be conducted for the particular non-clustered index. If the particular non-clustered index is not found, then the particular non-clustered index may be generated.

One or more embodiments include determining an execution plan that is associated with the model plan characteristic for another execution of the particular query statement (Operation 226). Various ways for determining an execution plan that is associated with the model plan characteristic may be used, as further described below.

In an embodiment, multiple candidate execution plans may be determined for the particular query statement. Candidate execution plans that are not associated with the model plan characteristic are discarded. An execution plan is selected from the remaining candidate execution plans that are associated with the model plan characteristic. The selected execution plan may be same as an execution plan that was previously used to execute the particular query statement. Alternatively, the selected execution plan may be different from any execution plan that was previously used to execute the particular query statement, while the selected execution plan still shares the model plan characteristic with at least one execution plan that was previously used to execute the particular query statement.

As an example, a model plan characteristic, for a particular query statement, may be using a particular non-clustered index. Multiple candidate execution plans may be determined for the particular query statement. A first candidate execution plan may use the particular non-clustered index. A second candidate execution plan does not use any index. The second candidate execution plan may be discarded. The first candidate execution plan may be selected for execution of the particular query statement.

In an embodiment, the model plan characteristic is set as a requirement for a plan determination engine. As the plan determination engine determines an execution plan for the particular query statement, the plan determination engine is restricted to using an execution plan that is associated with the model plan characteristic. The execution plan, determined for another execution of the particular query statement, may be same as an execution plan that was previously used to execute the particular query statement. Alternatively, the determined execution plan may be different from any execution plan that was previously used to execute the particular query statement, while the determined execution plan still shares the model plan characteristic with at least one execution plan that was previously used to execute the particular query statement.

As an example, a model plan characteristic, for a particular query statement, may be using a particular non-clustered index. A plan determination engine may determine steps to be included in an execution plan. A step that would lead to using the particular non-clustered index is attempted by the plan determination engine. A step that would not lead to using the particular non-clustered index is not attempted by the plan determination engine. Hence, the plan determination engine may determine an execution plan, for the particular query statement, that uses the particular non-clustered index.

In an embodiment, an execution plan that is associated with the model plan characteristic may be determined for a current execution and/or future execution of the particular query statement.

An execution plan that is associated with the model plan characteristic may be determined concurrently with and/or after a request for another execution of the particular query statement is obtained. In particular, after the query execution at Operation 218 is performed, a request for another execution of the particular query statement is obtained. The query execution in response to the request may be referred to as a "current execution." The execution plan, associated with the model plan characteristic, may be determined as and/or after the request is obtained. Hence, the execution plan is determined for a "current execution" of the particular query statement.

Additionally or alternatively, an execution plan that is associated with the model plan characteristic may be determined before a request for another execution of the particular query statement is obtained. Hence, the execution plan is determined for one or more future executions of the particular query statement.

One or more embodiments include executing the particular query statement using the execution plan associated with the model plan characteristic (Operation 228). The particular query statement is executed using the execution plan determined at Operation 226. The execution plan is associated with the model plan characteristic. The steps of the model plan characteristic are performed to retrieve information, from the database, in response to the particular query statement.

4. Example Embodiments

Detailed examples are described below for purposes of clarity. Components and/or operations described below should be understood as specific examples which may not be applicable to certain embodiments. Accordingly, components and/or operations described below should not be construed as limiting the scope of any of the claims.

Figure 3A:
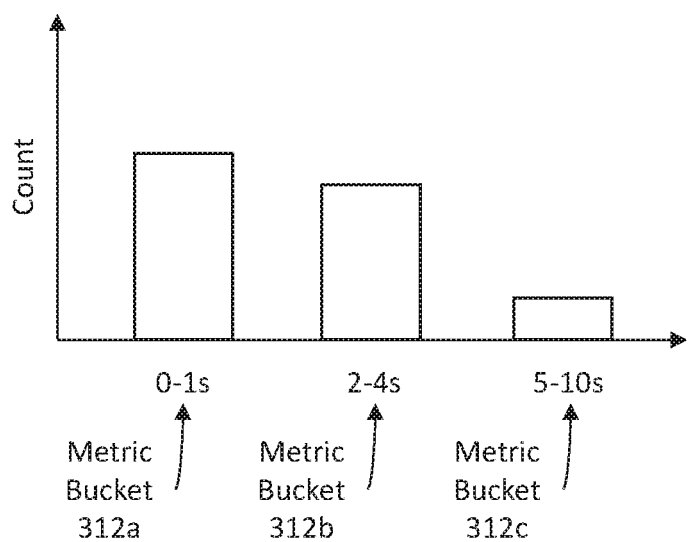
FIG. 3A illustrates an example set of information, presented at a graphical interface, for conducting database analysis based on a random archive, in accordance with one or more embodiments.

FIG. 3A illustrates an example set of information, presented at a graphical interface, for conducting database analysis based on a random archive, in accordance with one or more embodiments.

Query statements may be executed on a database server. Activity snapshots of the database server are captured once every second. Activity snapshots corresponding to a time period of interest are identified. Example activity snapshots include:

Activity snapshot at 9:00:00—

| Execution ID | Statement ID | Plan ID | Status |
|---|---|---|---|
| 234 | 124 | 536 | On CPU |
| 223 | 341 | 544 | Waiting for System I/O |

Activity snapshot at 9:00:01—

| Execution ID | Statement ID | Plan ID | Status |
|---|---|---|---|
| 234 | 124 | 536 | On CPU |
| 225 | 124 | 536 | On CPU |

Activity snapshot at 9:00:02—

| Execution ID | Statement ID | Plan ID | Status |
|---|---|---|---|
| 234 | 124 | 536 | Waiting for System I/O |
| 225 | 124 | 536 | Idle |
| 226 | 124 | 537 | On CPU |

Activity snapshot at 9:00:03—

| Execution ID | Statement ID | Plan ID | Status |
|---|---|---|---|
| 234 | 124 | 536 | On CPU |
| 226 | 124 | 537 | On CPU |

The activity snapshots, for the time period of interest, are aggregated to determine performance metrics for each execution of a query statement. For Execution ID 234, for example, three activity snapshots show that the query execution status is "On CPU." One activity snapshot shows that the query execution status is "Waiting for System I/O." Accordingly, Execution ID 234 is associated with a CPU time of 3 seconds, and an I/O time of 1 second, and a total execution time of 4 seconds.

By aggregating the above example activity snapshots, the performance metrics are:

| Execution ID | CPU Time | I/O Time | Total Execution Time |
|---|---|---|---|
| 234 | 3 | 1 | 4 |
| 223 | 0 | 1 | 1 |
| 225 | 1 | 0 | 2 |
| 226 | 2 | 0 | 2 |

A subset of query statements are randomly selected for storage into a random archive. A random sampling function includes applying a hash function, as further described below.

The current time on the database server, when the random selection is being performed, may be 9:02:00. Statement ID 124 and the current time 9:02:00 are concatenated. A hash function is applied to the concatenated result. The result of the hash function is less than or equal to a threshold value. Hence, Statement ID 124 is selected.

Statement ID 341 and the current time 9:02:00 are concatenated. A hash function is applied to the concatenated result. The result of the hash function is greater than the threshold value. Hence, Statement ID 341 is not selected.

A metric bucket is determined for each execution of each selected query statement. The possible metric buckets include: A CPU time bucket for a CPU time between 0 and 1 second; a CPU time bucket for a CPU time between 2 and 4 seconds; a CPU time bucket for a CPU time between 5 and 10 seconds; an I/O time bucket for an I/O time between 0 and 1 second; an I/O time bucket for an I/O time between 2 and 4 seconds; an I/O time bucket for an I/O time between 5 and 10 seconds; a total execution time bucket for a total execution time between 0 and 1 second; a total execution time bucket for a total execution time between 2 and 4 seconds; a total execution time bucket for a total execution time between 5 and 10 seconds. The metric buckets corresponding to the executions of Statement ID 124 are as follows:

| Execution ID | Statement ID | Plan ID | CPU Time Bucket | I/O Time Bucket | Total Execution Time Bucket |
|---|---|---|---|---|---|
| 234 | 124 | 536 | 2-4 | 0-1 | 2-4 |
| 225 | 124 | 536 | 0-1 | 0-1 | 2-4 |
| 226 | 124 | 537 | 2-4 | 0-1 | 2-4 |

Aggregate performance metrics are determined for query executions associated with (a) the same metric bucket and (b) the same execution plan. An aggregate performance metric is a count of the query executions associated with (a) the same metric bucket and (b) the same execution plan.

Based on the above example activity snapshots, the count for each metric bucket and Plan ID 536 is as follows:

| Metric Bucket | Count |
|---|---|
| CPU Time Bucket for 0-1 seconds | 1 |
| CPU Time Bucket for 2-4 seconds | 1 |
| CPU Time Bucket for 5-10 seconds | 0 |
| I/O Time Bucket for 0-1 seconds | 2 |
| I/O Time Bucket for 2-4 seconds | 0 |
| I/O Time Bucket for 5-10 seconds | 0 |
| Total Execution Time Bucket for 0-1 seconds | 0 |
| Total Execution Time Bucket for 2-4 seconds | 2 |
| Total Execution Time Bucket for 5-10 seconds | 0 |

Activity snapshots in addition to the above example activity snapshots are included in the time period of interest. A count for the CPU time buckets and Plan ID 536 for the time period of interest may be as follows:

| Metric Bucket | Count |
|---|---|
| CPU Time Bucket for 0-1 seconds | 342 |
| CPU Time Bucket for 2-4 seconds | 278 |
| CPU Time Bucket for 5-10 seconds | 34 |

Accordingly, information associated with each execution of Statement ID 124 is stored into a random archive. The information stored includes: CPU time, I/O time, total execution time, CPU time bucket, I/O time bucket, total execution time bucket, and/or aggregate performance metrics. Information for Statement ID 341 is not stored into the random archive.

Referring to FIG. 3A, graph 302 is determined based on information stored in the random archive. Graph 302 is presented at a user interface. Graph 302 shows the CPU time buckets 312a-c for executing Statement ID 124 using Plan ID 536. CPU time bucket 312a corresponds to CPU Time Bucket for 0-1 seconds. CPU time bucket 312b corresponds to CPU Time Bucket for 2-4 seconds. CPU time bucket 312c corresponds to CPU Time Bucket for 5-10 seconds. As illustrated, for example, graph 302 indicates that CPU time bucket 312a is associated with 342 query executions; CPU time bucket 312b is associated with 278 query executions; and CPU time bucket 312c is associated with 34 query executions.

Figure 3B:
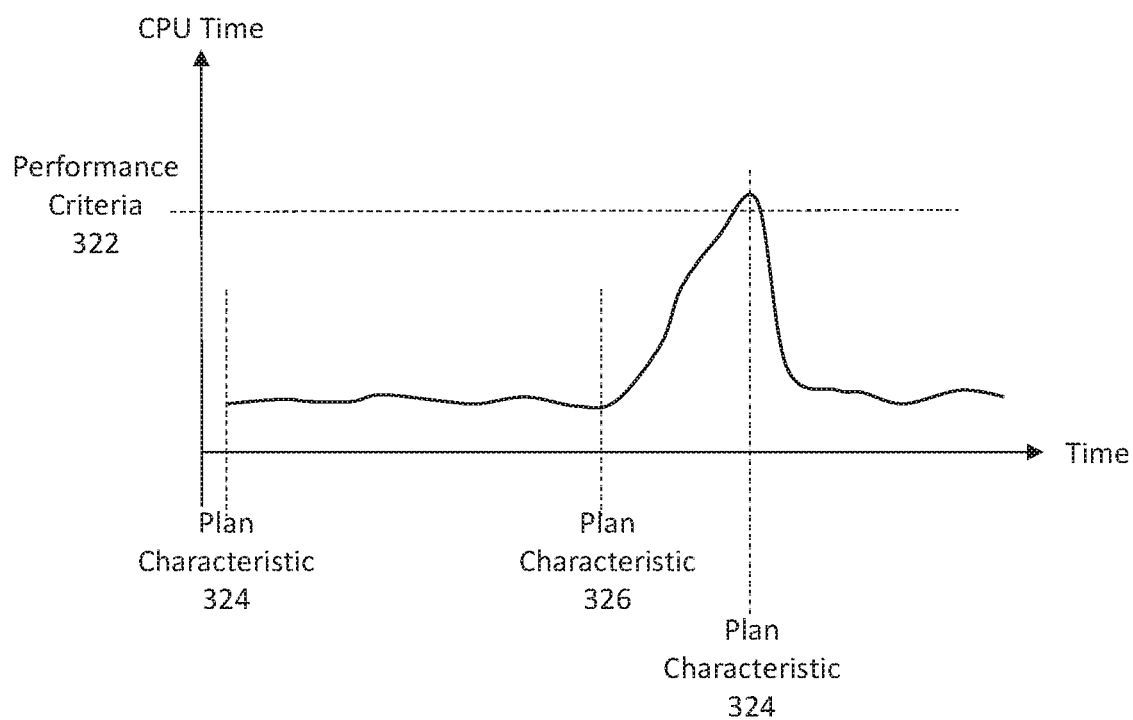
FIG. 3B illustrates an example for determining plan characteristics associated with a query statement based on database performance analysis using a random archive, in accordance with one or more embodiments.

FIG. 3B illustrates an example for determining plan characteristics associated with a query statement based on database performance analysis using a random archive, in accordance with one or more embodiments.

A query statement corresponding to Statement ID 124 may be, for example: SELECT*FROM persons WHERE age>25 and height>6.

A CPU time for a current execution of Statement ID 124 on a database server is determined. The CPU time for the current execution is compared with performance criteria 322. The CPU time for the current execution does not satisfy performance criteria 322.

Responsive to determining that the CPU time for the current execution does not satisfy performance criteria 322, executions of Statement ID 124 are identified from a random archive for analysis.

The random archive stores information for executions of Statement ID 124 on the database server. The random archive does not store information for every execution of Statement ID 124 on the database server. The random archive stores information for executions of Statement ID 124 that occur during certain time periods, but not all time periods. In particular, when performing random selection of query statements for storage with respect to each of the certain time periods, Statement ID 124 was selected for storage. The random archive stores, for example, the CPU time for each query execution, and the execution plan for each query execution.

One execution plan for Statement ID 124 may use a clustered index on the age column. In particular, the index for entries matching age>25 is scanned. From the matching results, entries matching height>6 are identified. As illustrated in FIG. 3B, using the clustered index on the age column corresponds to plan characteristic 324.

Another execution plan for Statement ID 124 does not use any indexes. The persons table is scanned for all entries that match both age>25 and height>6. As illustrated in FIG. 3B, not using any indexes corresponds to plan characteristic 326.

Based on information stored in the random archive, graph 304 shows the CPU time for query executions of Statement ID 124 over time. Initially, the CPU time is well below performance criteria 322. Further, initially, an execution plan associated with plan characteristic 324 (using a clustered index on the age column) is used for executing Statement ID 124. Subsequently, an execution plan for Statement ID 124 may be changed. For example, the clustered index on the age column may be deleted from memory, or might not be locatable. Hence, an execution plan associated with plan characteristic 326 (not using any indexes), instead of plan characteristic 324, is used. After the change in execution plans, the CPU time may begin to increase. Eventually, the CPU time for an execution of Statement ID 124 exceeds the threshold time required by performance criteria 322.

As describe above, the random archive stores information for executions of Statement ID 124 on the database server. Performance metrics for the executions of Statement ID 124 are retrieved from the random archive. The performance metrics are compared with a model criteria. Executions of Statement ID 124 that satisfy the model criteria are identified.

Plan characteristics associated with execution plans used for the identified query executions are determined. One plan characteristic associated with execution plans used for the identified query executions is plan characteristic 324 (using a clustered index on the age column). Plan characteristic 324 is determined as a model plan characteristic for Statement ID 124. Further a clustered index on the age column may be regenerated.

A request for another execution of Statement ID 124 is obtained. Multiple candidate execution plans for Statement ID 124 are determined. One execution plan is associated with plan characteristic 324 (using a clustered index on the age column), not plan characteristic 326. Another execution is associated with plan characteristic 326 (not using any indexes), not plan characteristic 324. The execution plan associated with plan characteristic 324 is selected for executing Statement ID 124 in response to the request. The execution plan associated with plan characteristic 326 is not selected.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
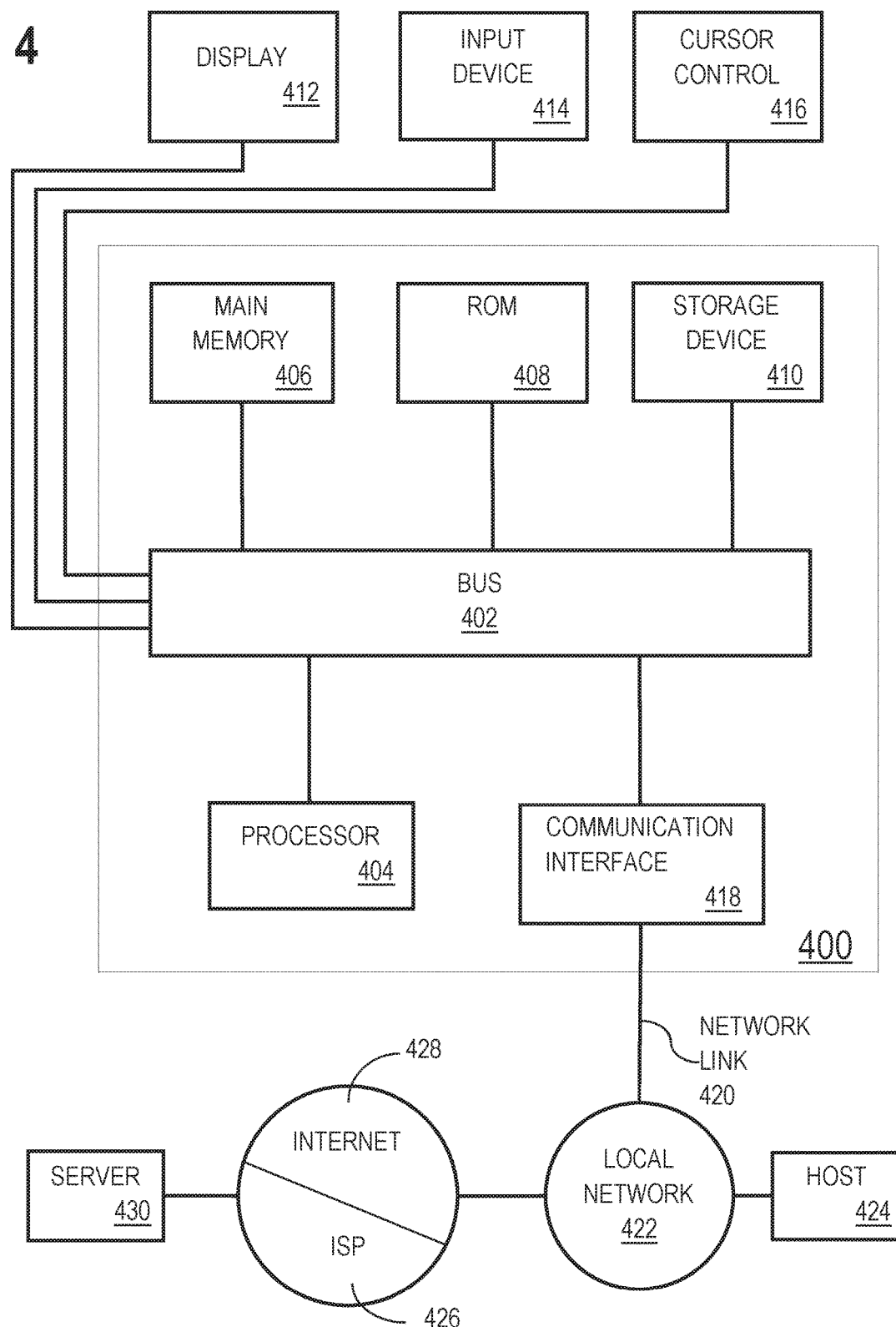
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media storing instructions which, when executed by one or more hardware processors, cause:
   identifying a first plurality of query statements that are executed at least once within a first time period;
   executing a random sampling function to randomly select a first set of query statements from the first plurality of query statements, wherein the first set of query statements includes a particular query statement;

responsive to selecting the particular query statement using the random sampling function: identifying a first plurality of executions of the particular query statement within the first time period for including into a selected set of executions;

determining a model plan characteristic based on at least a subset of the selected set of executions, wherein the subset of the selected set of executions includes the first plurality of executions of the particular query statement within the first time period;

determining an execution plan for an execution of the particular query statement, the execution plan being associated with the model plan characteristic.

2. The medium of claim 1, wherein the random sampling function is executed as the first plurality of query statements are being identified.

3. The medium of claim 1, wherein determining the model plan characteristic based on the first plurality of executions of the particular query statement within the first time period is responsive to the particular query statement being selected from the first plurality of query statements by the random sampling function.

4. The medium of claim 1, further storing instructions which cause:
identifying a second plurality of query statements that are executed at least once within a second time period;
executing the random sampling function to randomly select a second set of query statements from the second plurality of query statements, wherein the second plurality of query statements includes the particular query statement, and the second set of query statements does not include the particular query statement;
wherein the model plan characteristic is not determined based on a second plurality of executions of the particular query statement within the second time period.

5. The medium of claim 1, further storing instructions which cause:
determining a first performance metric associated with a first execution, of the first plurality of executions of the particular query statement within the first time period;
responsive to determining that the first performance metric is above a model criteria:
determining the model plan characteristic using a first plan characteristic associated with the first execution.

6. The medium of claim 1, further storing instructions which cause:
determining a first number of query statements, in the first plurality of query statements, that are executed at least once within the first time period;
determining a second number of query statements to randomly select from the first plurality of query statements based on the first number of query statements.

7. The medium of claim 1, wherein the model plan characteristic comprises at least one of:
(a) whether an index is used;
(b) a type of an index that is used;
(c) an identity of a table that is used;
(d) a type of join that is performed on a set of tables;
(e) a sequence of steps that are performed;
(f) a field that is used to access an entry in a table;
(g) a complete set of steps that are included in the first execution plan.

8. The medium of claim 1, wherein a plan characteristic associated with a first execution plan used in a first execution, of the first plurality of executions of the particular query statement within the first time period, is stored into a random archive.

9. The media of claim 1, further storing instructions which cause:
responsive to identifying the first plurality of executions of the particular query statement within the first time period for including into the selected set of executions:
storing execution plans used for the plurality of executions of the particular query statement within the first time period into a data repository;
the data repository does not store executions plans used for executions of the particular query statement that are not included in the selected set of executions, such that the data repository does not store execution plans used for executions of the particular query statement within a second time period.

10. The media of claim 1, further storing instructions which cause:
comparing respective performance metrics of the selected set of executions with a model criteria, wherein comparing the respective metrics of the selected set of executions with the model criteria comprises: determining that a first performance metric of a first execution, of the first plurality of executions of the particular query statement within the first time period, satisfies the model criteria;
responsive to determining that the first performance metric of the first execution satisfies the model criteria: including the first execution into the subset of the selected set of executions for determining the model plan characteristic.

11. The media of claim 10, further storing instructions which cause:
determining the model criteria based on the selected set of executions.

12. The media of claim 1, further storing instructions which cause:
determining that a first performance metric of a first execution, of the plurality of executions of the particular query statement within the first time period, is better than a second performance metric of a second execution, of the plurality of executions of the particular query statement within the first time period;
responsive to determining that the first performance metric of the first execution is better than the second performance metric of the second execution: including the first execution into the subset of the selected set of executions for determining the model plan characteristic, and excluding the second execution from the subset of the selected set of executions for determining the model plan characteristic;
wherein the model plan characteristic is determined based on the first execution included into the subset of the selected set of executions, without using the second execution excluded from the subset of the selected set of executions.

13. The media of claim 1, further storing instructions which cause:
identifying a first subset of the first plurality of executions of the particular query statement within the first time period that use a first execution plan;
identifying a second subset of the first plurality of executions of the particular query statement within the first time period that use a second execution plan;
responsive to determining that a first performance metric associated with the first subset of executions is better than a second performance metric associated with the second subset of executions: including the first subset of executions into the subset of the selected set of executions for determining the model plan characteristic, and excluding the second subset of executions from the subset of the selected set of executions for determining the model plan characteristic;

wherein the model plan characteristic is determined based on the first execution plan, without using the second execution plan.

14. The media of claim 1, wherein the model plan characteristic comprises an execution plan used in at least one execution of the first plurality of executions of the particular query statement within the first time period.

15. The media of claim 1, further storing instructions which cause:
determining a performance criteria for the particular query statement based on the selected set of executions;
wherein determining the execution plan for the execution of the particular query statement is responsive to determining that a performance metric of a second execution of the particular query statement does not satisfy the performance criteria.

16. A system, comprising:
at least one device including a hardware processor; and
the system being configured to perform operations comprising:
identifying a first plurality of query statements that are executed at least once within a first time period;
executing a random sampling function to randomly select a first set of query statements from the first plurality of query statements, wherein the first set of query statements includes a particular query statement;
responsive to selecting the particular query statement using the random sampling function:
identifying a first plurality of executions of the particular query statement within the first time period for including into a selected set of executions;
determining a model plan characteristic based on at least a subset of the selected set of executions, wherein the subset of the selected set of executions includes the first plurality of executions of the particular query statement within the first time period;
determining an execution plan for an execution of the particular query statement, the execution plan being associated with the model plan characteristic.

17. The system of claim 16, wherein the random sampling function is executed as the first plurality of query statements are being identified.

18. The system of claim 16, wherein determining the model plan characteristic based on the first plurality of executions of the particular query statement within the first time period is responsive to the particular query statement being selected from the first plurality of query statements by the random sampling function.

19. The system of claim 16, wherein the operations further comprise:
identifying a second plurality of query statements that are executed at least once within a second time period;
executing the random sampling function to randomly select a second set of query statements from the second plurality of query statements, wherein the second plurality of query statements includes the particular query statement, and the second set of query statements does not include the particular query statement;

wherein the model plan characteristic is not determined based on a second plurality of executions of the particular query statement within the second time period.

20. A method, comprising:
identifying a first plurality of query statements that are executed at least once within a first time period;
executing a random sampling function to randomly select a first set of query statements from the first plurality of query statements, wherein the first set of query statements includes a particular query statement;
responsive to selecting the particular query statement using the random sampling function:
identifying a first plurality of executions of the particular query statement within the first time period for including into a selected set of executions;
determining a model plan characteristic based on at least a subset of the selected set of executions, wherein the subset of the selected set of executions includes the first plurality of executions of the particular query statement within the first time period;
determining an execution plan for an execution of the particular query statement, the execution plan being associated with the model plan characteristic;
wherein the method is executed by at least one device including a hardware processor.

21. The method of claim 20, wherein the random sampling function is executed as the first plurality of query statements are being identified.

22. The method of claim 20, wherein determining the model plan characteristic based on the first plurality of executions of the particular query statement within the first time period is responsive to the particular query statement being selected from the first plurality of query statements by the random sampling function.

23. The method of claim 20, further comprising:
identifying a second plurality of query statements that are executed at least once within a second time period;
executing the random sampling function to randomly select a second set of query statements from the second plurality of query statements, wherein the second plurality of query statements includes the particular query statement, and the second set of query statements does not include the particular query statement;
wherein the model plan characteristic is not determined based on a second plurality of executions of the particular query statement within the second time period.

24. One or more non-transitory machine-readable media storing instructions which, when executed by one or more processors, cause:
identifying a first plurality of query statements that are executed at least once within a first time period;
executing a random sampling function to randomly select a first set of query statements from the first plurality of query statements, wherein the first set of query statements includes a particular query statement;
responsive to selecting the particular query statement using the random sampling function:
identifying a plurality of executions of the particular query statement within the first time period;
storing, into an archive, information associated with the plurality of executions of the particular query statement within the first time period, wherein the information comprises at least one of execution plans, plan characteristics, and performance metrics;
identifying a second plurality of query statements that are executed at least once within a second time period;

executing the random sampling function to randomly select a second set of query statements from the second plurality of query statements, wherein the second plurality of query statements includes the particular query statement, and the second set of query statements does not include the particular query statement;

wherein the archive does not store any execution plans, plan characteristics, or performance metrics associated with executions of the particular query statement within the second time period.

25. The media of claim 24, further storing instructions which cause:

determining an execution plan for an execution of the particular query statement based on at least a subset of the information associated with the plurality of executions of the particular query statement within the first time period that is stored in the archive, without using any execution plans, plan characteristics, or performance metrics associated with executions of the particular query statement within the second time period.

* * * * *

UNITED STATES PATENT AND TRADEMARK OFFICE
CERTIFICATE OF CORRECTION

PATENT NO. : 10,997,171 B2
APPLICATION NO. : 16/024868
DATED : May 4, 2021
INVENTOR(S) : Maheshwari et al.

It is certified that error appears in the above-identified patent and that said Letters Patent is hereby corrected as shown below:

In the Claims

In Column 27, Line 16, in Claim 2, delete "medium" and insert -- media --, therefor.

In Column 27, Line 19, in Claim 3, delete "medium" and insert -- media --, therefor.

In Column 27, Line 25, in Claim 4, delete "medium" and insert -- media --, therefor.

In Column 27, Line 38, in Claim 5, delete "medium" and insert -- media --, therefor.

In Column 27, Line 48, in Claim 6, delete "medium" and insert -- media --, therefor.

In Column 27, Line 56, in Claim 7, delete "medium" and insert -- media --, therefor.

In Column 27, Line 66, in Claim 8, delete "medium" and insert -- media --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*